(12) United States Patent
Jackson

(10) Patent No.: US 6,239,897 B1
(45) Date of Patent: May 29, 2001

(54) CHIRP-CONTROLLED OPTICAL MODULATOR AND METHOD OF CONTROLLING CHIRP IN THE MODULATION OF AN OPTICAL SIGNAL

(75) Inventor: Michael K. Jackson, Richmond (CA)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/417,749

(22) Filed: May 26, 1998

Related U.S. Application Data

(63) Continuation-in-part of application No. 08/873,800, filed on Jun. 12, 1997, now abandoned.

(51) Int. Cl.[7] .................................................. G02F 1/035
(52) U.S. Cl. ................................................ 359/245; 385/2
(58) Field of Search ................................. 354/237, 245; 385/2

(56) References Cited

U.S. PATENT DOCUMENTS

| | | | |
|---|---|---|---|
| 5,278,923 | 1/1994 | Nazarathy et al. | 385/3 |
| 5,408,544 | * 4/1995 | Seino | 385/3 |
| 5,524,076 | * 6/1996 | Rolland et al. | 385/8 |
| 5,777,777 | * 7/1998 | Kaste et al. | 359/245 |
| 5,787,211 | * 7/1998 | Gopalakrishnan | 385/2 |

OTHER PUBLICATIONS

Linearization of Electro–Optic Modulators by a Cascade Coupling of Phase Modulating Electrodes, by Halvor Skeie and Richard V. Johnson SPIE, vol. 1583, Integrated Optical Circuits (1991) pp. 153–164.

* cited by examiner

*Primary Examiner*—Mark Hellner
(74) *Attorney, Agent, or Firm*—Hubert J. Barnhardt, III; Kenneth M. Massaroni; Kelly A. Gardner

(57) ABSTRACT

An optical signal is modulated by passing it through an optical signal path in an optical modulator. Different electric fields are applied across a first pair of parallel phase modulation arms so as to produce different signal phase modulations in respective portions of the optical signal; and different electric fields are also applied across a second pair of parallel phase modulation arms so as to produce different signal phase modulations in respective portions of the optical signal. The different magnitudes of the electric fields are pre-determined so as to control chirp and to promote modulation linearity. The chirp in the optical signal output from the optical modulator may be reduced or even eliminated or may be predetermined to counteract or even eliminate chirp generated in a transmission path.

8 Claims, 4 Drawing Sheets

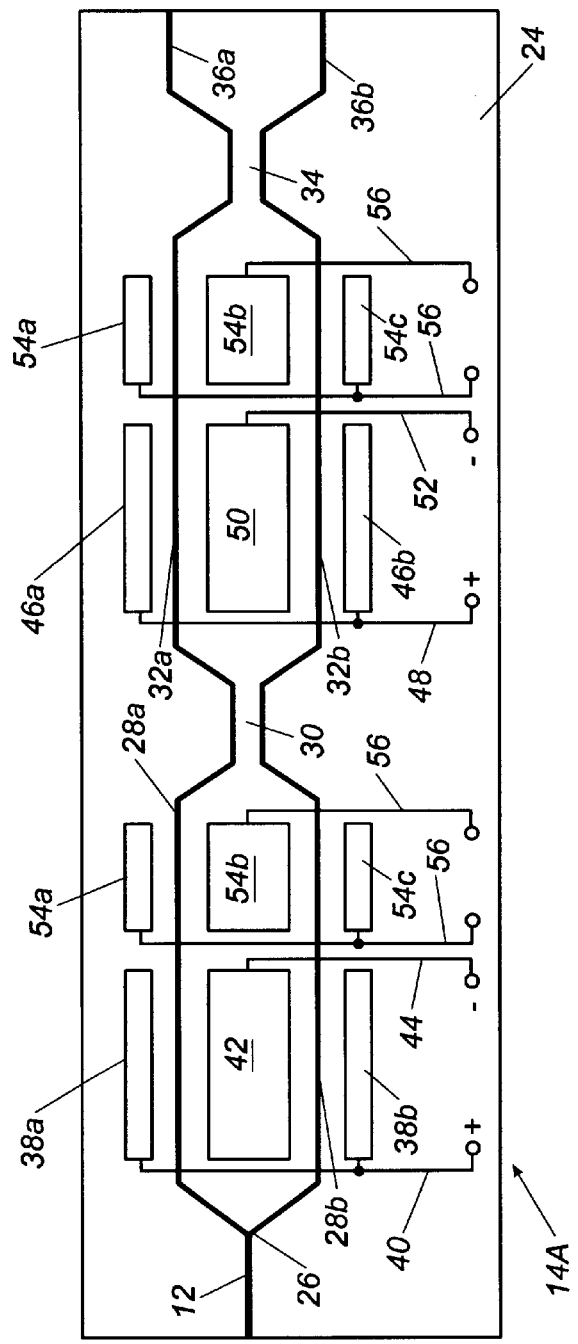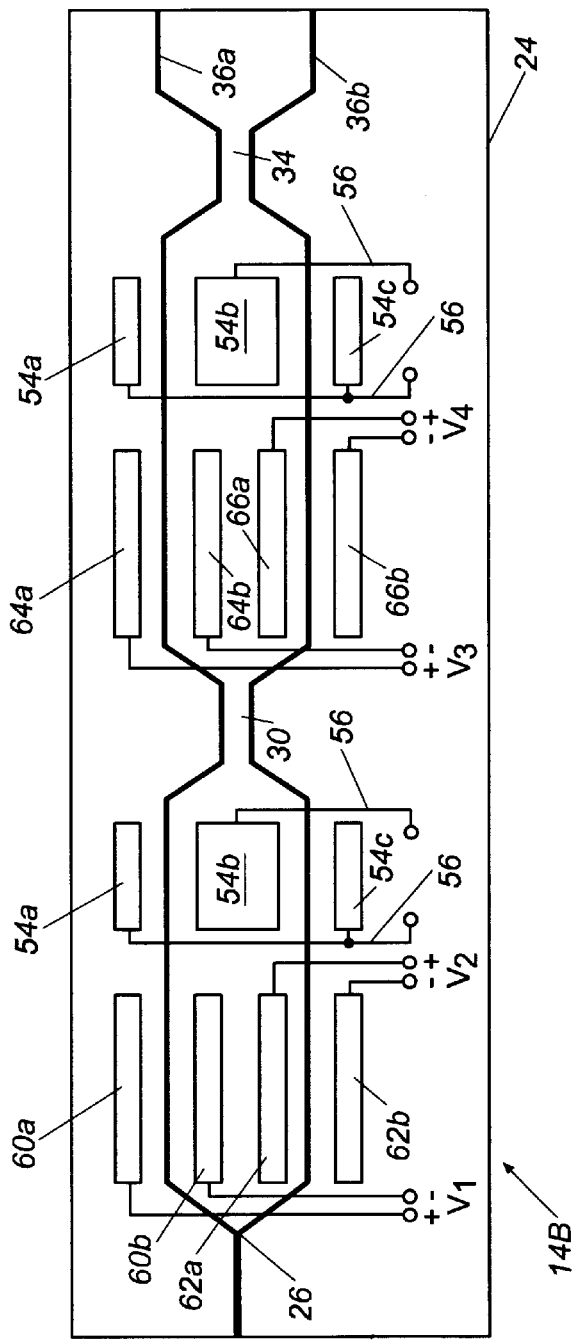

CHIRP-CONTROLLED OPTICAL MODULATOR AND METHOD OF CONTROLLING CHIRP IN THE MODULATION OF AN OPTICAL SIGNAL

CROSS-REFERENCE TO RELATED APPLICATION

This is a continuation in part of Ser. No. 08/873,800, filed Jun. 12, 1997, now abandoned.

BACKGROUND OF THE INVENTION

1. Field of the Invention

The present invention relates to chirp-controlled optical modulators, and to methods of controlling chirp in the modulation of optical signals, and is useful in particular, but not exclusively, for the modulation of optical signals in cable television (CATV) transmissions.

2. Description of the Related Art

It is well known in CATV systems to employ optic fibers for the transmission of television signals in the form of amplitude modulated vestigial side band optical signals. It is also well known to employ, as the source of the optical signals, a laser, for example a distributed feedback (DFB) semi-conductor laser, outputting an optical signal to an external optical modulator, for example an $LiNbO_3$ Mach-Zehnder modulator.

A two stage Mach-Zehnder modulator has an electro-optic substrate on which there is provided an optical signal path comprising, in succession, an input wave guide, a splitter, a first pair of parallel phase modulation arms, a first coupler, a second pair of phase modulation arms, a second coupler and an output wave guide. The parallel phase modulation arms are associated with modulation electrodes, by means of which variable electric fields are applied across the modulation arms in order to correspondingly vary the refractive index of the electro-optical material of these arms and, thereby, to modulate an optical signal passing along the signal path.

It has become apparent by experimentation that there is significant composite second order (CSO) distortion generation with increasing fiber length in an analog optical fiber transmission system when using a prior art external optical modulator. The origin of this degradation has been confirmed, by experimental and theoretical considerations, to be the generation of chirp in the modulator.

It has previously been proposed to provide a single stage optical modulator with low chirp. Reference is made in this connection to Djupsjobacka "Residual Chirp in Integrated-optic Modulators", IEEE Photonics Technology Letters, Volume 4, No. 1, pp 41–43, Jan. 1992, according to which the dispersion effects of residual chirp arising from asymmetry in field overlap in Mach-Zehnder structures is analyzed and measured to indicate that a simple model for fiber mode propagation can be used together with an FFT-algorithm for calculating the effect of residual chirp from external modulators in multigigabit digital dispersive fiber-optic systems.

BRIEF SUMMARY OF THE INVENTION

It has now been found that it is possible to achieve optical linearization closely comparable with that provided by prior art modulators, while simultaneously controlling chirp generation.

According to the present invention, there is provided a method of modulating an optical signal in which pre-determined different electrical fields are applied across parallel phase modulation arms of an optical modulator, and the magnitudes of the electrical fields are pre-determined so as to control chirp.

The different electrical fields can be produced by correspondingly pre-determined differences in the dimensions of the electrodes i.e. by correspondingly pre-determining the lengths of the modulating electrodes, in the direction along which light is propagated in the optical signal path, or differences in the spacings of the electrodes from the phase modulations arms, or by applying pre-determined different modulation signals to the electrodes.

BRIEF DESCRIPTION OF THE DRAWINGS

The invention will be more readily understood from the following description of preferred embodiments thereof given, by way of example, with reference to the diagrammatic drawings, in which:

FIG. 2 shows in greater detail components of an optical modulator according to a first embodiment of the present invention;

FIG. 3 shows a view corresponding to that of FIG. 2 but of a second embodiment of the present invention;

DESCRIPTION OF THE PREFERRED EMBODIMENTS

Figure 1:
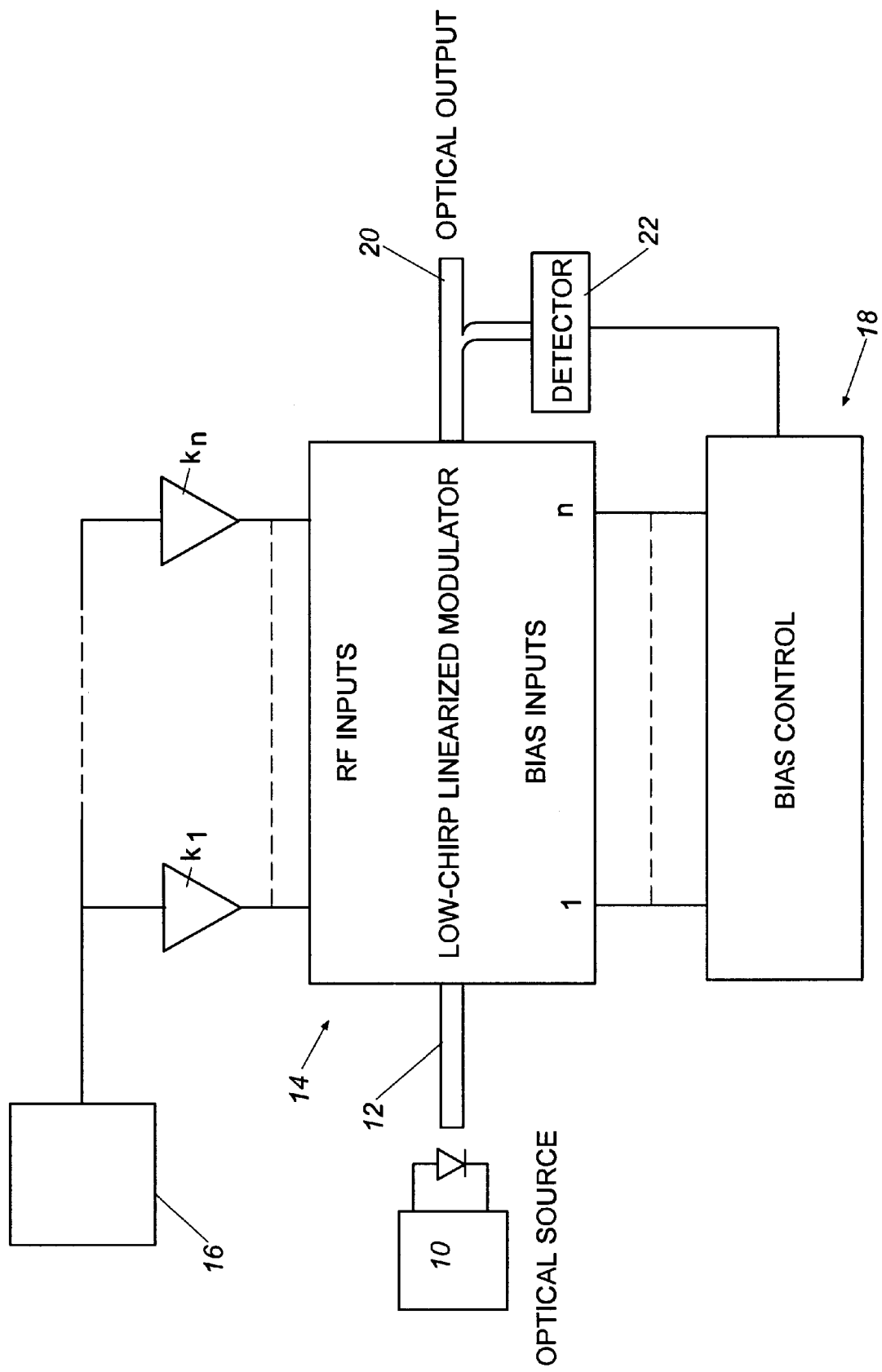
FIG. 1 shows a block diagram illustrating an optical modulator according to the present invention, with associated optical signal and reference voltage sources.

FIG. 1 shows an optical signal source in the form of a distributed feedback semi-conductor laser 10 providing an optical signal to an input wave guide 12 of an optical modulator indicated generally by reference numeral 14.

A modulation voltage source 16 is connected to the optical modulator 14 through a plurality of inputs $k_1 \ldots k_n$ and may, for example, comprise a satellite downlink or other "head-end" in a cable television network.

The modulator 14 is also provided with a bias control indicated generally by reference numeral 18, having a corresponding number of bias inputs 1 . . . n. The number of these bias inputs may be equal to or different from the number of the modulating voltage inputs $k_1 \ldots k_n$. The bias control 18 measures a small fraction of the output signal of the modulator, obtained from an output wave guide 20 through a detector 22, and provides bias voltage to the bias inputs 1 . . . n, these bias voltages being constantly adjusted to maintain their minimum composite second order (CSO) distortion signals at the modulator output. However, as will be apparent to those skilled in the art, the bias and modulating inputs may alternatively be combined by means of a bias-tee (not shown) and fed to a single input, thus eliminating any need for separate bias inputs and electrodes.

As known in the art, the bias control unit 18 comprises a microcontroller (not shown) which, through the detector 22, monitors the locally generated CSO, and correspondingly adjusts the bias voltages at the bias inputs 1 . . . n, in succession, so as to produce the lowest possible output from the detector 22. In this manner, the bias control unit 18 cycles through all of the bias inputs so as to maintain the locally generated CSO as low as possible, and thereby to provide the optimum possible linearization of the modulator.

FIG. 2 diagrammatically illustrates one embodiment, indicated generally by reference numeral 14a, of the modulator 14 of FIG. 1.

More particularly, FIG. 2 shows an optical signal path provided on an electro-optic substrate 24, the optical signal path comprising the input wave guide 12, a Y-splitter 26, parallel phase modulation arms 28a and 28b, a coupler 30, a second pair of parallel phase modulation arms 32a and 32b, a second coupler indicated generally by reference numeral 34 and wave guide outputs 36a and 36b.

The first pair of parallel phase modulation arms 28a, 28b are associated with respective modulating electrodes 38a and 38b, connected to conductor 40, and with a common intermediate modulating electrode 42, connected to a conductor 44.

Although for convenience of illustration, the electrodes 38a and 38b have each been illustrated in FIG. 2 as a one-piece electrode, it should be understood that, as will be readily apparent to those skilled in the art, each of these electrodes may comprise separate electrode portions. It is, however, to be noted that the effective lengths of the electrodes 38a and 38b differ from one another, for the purpose discussed in greater detail below.

Likewise, the parallel phase modulation arms 32a and 32b are associated with respective modulation electrodes 46a and 46b which have different effective lengths and which may each be in the form of a plurality of separate electrode portions, the electrodes 46a and 46b being connected to a common conductor 48, and with a common intermediate modulation electrode 50 located between the parallel phase modulation arms 32a and 32b and connected to a conductor 52.

The first and second pairs of phase modulation arms 28a, 28b, 32a and 32b are also provided with bias electrodes 54a, 54b and 54c, which are connected by conductors 56 to the bias control unit 18 of FIG. 1 and which serve to bias the modulator 14a in a manner which is well known to those skilled in the art and which, therefore, is not described in greater detail herein.

Alternatively, the bias electrodes may be combined with the modulation electrodes 46a, 46b and 50 to form combined bias and modulation electrodes, which serve to effect both biasing and modulation, in a manner known in the art. In that case, the bias and modulation inputs may be combined by means of a bias-tee, as mentioned above, and fed to the combined bias and modulation electrodes.

In the present embodiment of the invention, a single radio frequency signal voltage $v_1$ in from the radio frequency signal source 16 is connected across the terminals 40 and 44 and the terminals 48 and 52 to provide electric fields across the first and second pairs of phase modulation arms 28a, 28b, 32a and 32b.

The embodiment of FIG. 3 has an electro-optic material substrate 24 and an optical signal path which is similar to that of FIG. 2 and which, therefore, will not be further described.

In the embodiment of FIG. 3, however, each of the first and second pairs of phase modulation arms of the signal path has a pair of modulation electrodes 60a, 60b; 62a, 62b; 64a, 64b and 66a, 66b, and these pairs are connected, as shown, to have voltages $V_1 \ldots V_4$ applied across them from the inputs $k_1 \ldots k_n$. In this embodiment of the invention, the inputs $k_1 \ldots k_n$ comprise amplifiers of different gains, so that the voltages $v_1 \ldots v_n$ applied to the modulator electrodes are correspondingly different. Consequently, four correspondingly different electric fields are applied across the four phase modulation arms 28a, 28b and 32a, 32b.

The modulators of FIGS. 2 and 3 enable chirp control, e.g. to provide low chirp linearized modulation, to be achieved by controlling the phase modulation efficiencies of the phase modulation arms 28a, 28b and 32a, 32b by employing electrodes of different lengths, as described above with respect to FIG. 2, or by driving each arm with a different amplitude RF signal, as described above with reference to FIG. 3. A further possibility for adjusting the modulation efficiency in each of the arms is to adjust the spacing between the modulation electrodes and the arms so as to correspondingly vary the electric field present in the respective arms for a given drive voltage.

The required response of the modulator can be calculated as follows, with reference to FIG. 3.

From a point following the Y-splitter 26, the electric field phasors for the upper and lower phase modulation arms 28a, 28b, $E^{upper}$ and $E^{lower}$ are described with a vector $$\begin{bmatrix} E^{upper} \\ E^{lower} \end{bmatrix}$$

The first phase modulator is modelled by a matrix:

$$\overline{M}_{pm}^{(1)} = \begin{bmatrix} \exp i(a_1 v_1 + b_1) & 0 \\ 0 & \exp i(a_2 v_2 + b_2) \end{bmatrix}$$

A similar matrix described in the second phase modulator:

$$\overline{M}_{pm}^{(2)} = \begin{bmatrix} \exp i(a_3 v_3 + b_3) & 0 \\ 0 & \exp i(a_4 v_4 + b_4) \end{bmatrix}$$

The following matix describes the first directional coupler 30:

$$\overline{M}_c^{(1)} = \begin{bmatrix} \cos\gamma_1 & -i\sin\gamma_1 \\ -i\sin\gamma_1 & \cos\gamma_1 \end{bmatrix}$$

and the second directional coupler 34 is described by:

$$\overline{M}_c^{(2)} = \begin{bmatrix} \cos\gamma_2 & -i\sin\gamma_2 \\ -i\sin\gamma_2 & \cos\gamma_2 \end{bmatrix}$$

The phasors describing the two output signals of the wave guides outputs 36a, 36b can be obtained from:

$$\begin{bmatrix} E_{out}^A \\ E_{out}^B \end{bmatrix} = \overline{M}_c^{(2)} \overline{M}_{pm}^{(2)} \overline{M}_c^{(1)} \overline{M}_{pm}^{(1)} \begin{bmatrix} 1/\sqrt{2} \\ 1/\sqrt{2} \end{bmatrix}$$

The field amplitudes after the Y-splitter have been normalized to $1\sqrt{2}$. The intensity transfer function for output 36a is given by $$S^A = \frac{1}{2}|E_{out}^A|^2$$

The chirp is recovered from the phase of the electric field output using $$\begin{bmatrix} E_{out}^A \\ E_{out}^B \end{bmatrix} = \begin{bmatrix} |E_{out}^A|\exp(i\phi^A) \\ |E_{out}^B|\exp(i\phi^B) \end{bmatrix}$$

Here $$|E^A_{out}| \text{ and } |E^B_{out}|$$

and are the magnitudes of the two output electric fields and $\phi^A$ and $\phi^B$ are the corresponding phases. The relationship between power transmission and the phase is described by the chirp parameter; for output A, this is given by $$\alpha^A = \frac{d\phi^A/dt}{\frac{1}{2S^A}\frac{dS^A}{dt}}$$

Using this theoretical framework, the intensity and chirp can be determined for a given modulator design. In the modulator 14B of the FIG. 2:

$$v_3 = -v_2$$

An unamplified rf input is applied to the first modulator section as the voltage $v_1$.

For the second modulator section:

$$v_3 = -v_4$$

and we apply a scaled rf input $kv_1 = v_3 = -v_4$.

The modulator intensity transfer functions and chirp parameters for a given set of modulation efficiencies and coupler angles can thus be calculated. From this, a heuristic figure of merit combines the slope efficiency of the intensity transfer function, the third and fifth order nonlinearities (which contribute to composite triple beat, or CTB distortion), and the chirp parameter is obtained. Second order nonlinearities that directly generate CSO at the modulator are zero when the bias voltages 1 . . . n are zero. The only function of the bias control circuitry is to compensate for slight length mismatches in the fabricated device, and their drifts with time and temperature. Using the figure of merit described, a numerical optimization is conducted to find the best figure of merit by adjusting the four modulation efficiencies and the two coupler angles.

Figure 4:
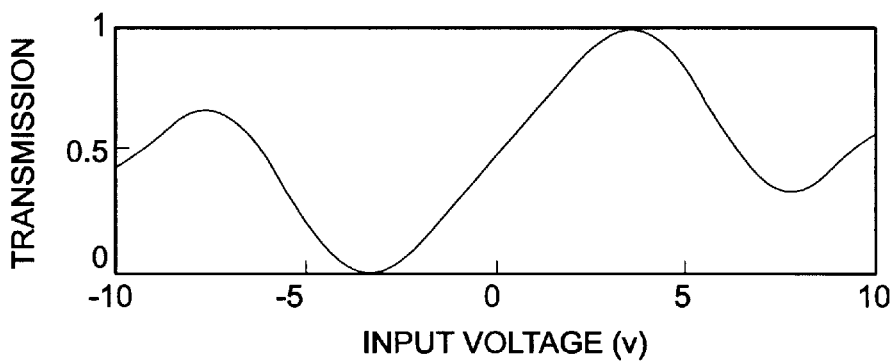
FIG. 4 shows a graph illustrating the relationship between the intensity transfer function and the input voltage in an optical modulator embodying the present invention.
Figure 5:
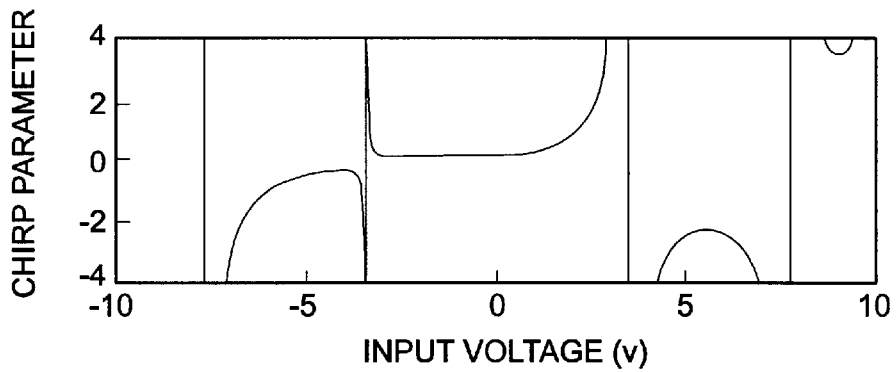
FIG. 5 shows a graph illustrating the variation of the chirp parameter with the input voltage in a modulator embodying the present invention.
Figure 6:
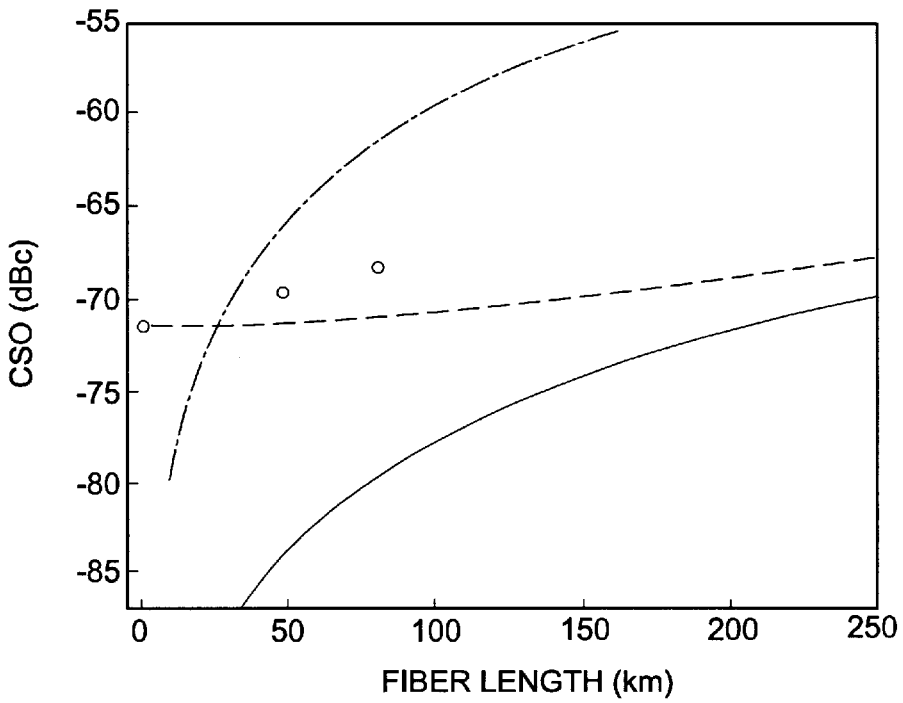
FIG. 6 shows the relationship of calculated CSO and fiber length for an optical modulator embodying the present invention and for a prior art optical modulator, in addition to experimental measurements for an optical modulator embodying the present invention.

FIGS. 4 and 5 show the intensity transfer function and chirp parameter for a low chirp modulator such as that shown in FIG. 2. FIG. 6 shows the calculated system CSO for an 80 channel NTSC frequency plan as a function of fiber length calculated as above (solid line). For comparison, the dot-dash line shows the same calculation for a conventional modulator which is much worse. If −65dBc is defined as a performance criterion, the conventional modulator becomes unacceptably bad after 50 km. while the low-chirp design meets this specification to beyond 300 km. The open circles of FIG. 6 show experimental results. The CSO for small fiber lengths includes contributions due to the finite errors in the bias control circuitry as well as CSO distortion present in the RF input amplifiers. If these are added to the chirp generated calculated CSO, the result is the dashed curve in FIG. 6. This is in excellent agreement with predictions, and the difference is ascribed to small errors in fabrication process.

It has been found in practice that, with high output transmitters, non-linear effects, and specifically self-phase modulations, occur in the transmission path, which cause chirp to be added to signals while the signals are propagating in the fiber transmission path.

Figure 7:
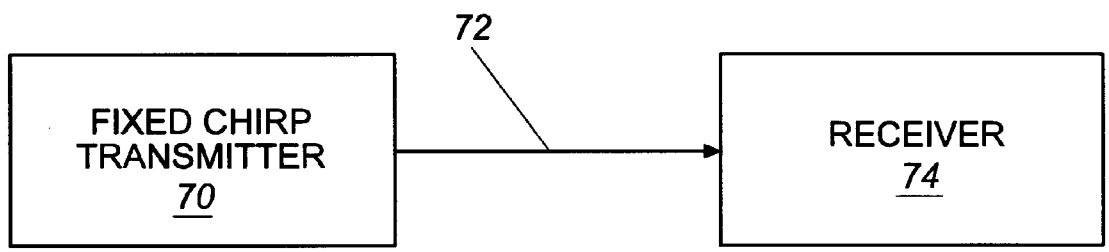
FIG. 7 shows a block diagram showing a transmitter embodying the present invention for transmitting an optical signal through a transmission path to a receiver.

For example, reference is made to FIG. 7, in which a fixed chirp transmitter 70, which is a high power transmitter incorporating an optical modulator such as those described above with reference to FIGS. 1 through 3, is shown as outputting through a transmission fiber 72 to a receiver 74. Chirp is generated in the transmission fiber 72 which has a dependence on the intensity of the propagated signal.

It is therefore possible to employ in the transmitter a modulator which produces chirp having a magnitude and a sign which are predetermined so as to cancel chirp produced in the transmission path 72 by the signal from the transmitter 70 after propagation through the transmission fiber 72.

For that purpose, the magnitude and sign of the chirp generated in the transmission fiber 72 by self-phase modulation is determined employing a well-known non-linear propagation for an electric field envelope function, and solving the equation numerically by split step Fourier transform or analytically, in the case where non-linearity and dispersion are low. The chirp produced in the transmitter, instead of being minimized as much as possible, is then predetermined, in the manner described above with reference to FIGS. 1 through 6, to the required magnitude and sign to cancel the chirp generated in the transmission fiber 72.

I claim:

1. A method of controlling chirp in the modulation of an optical signal passing through an optical signal path in an optical modulator, the optical signal path comprising in succession an input wave guide, a splitter, a first pair of parallel phase modulation arms, a first coupler, a second pair of phase modulation arms, a second coupler and an output wave guide, said method comprising the steps of:

applying different electric fields across said first pair of parallel phase modulation arms so as to produce different signal phase modulations in respective portions of said optical signal;

applying different electric fields across said second pair of parallel phase modulation arms so as to produce different signal phase modulations in respective portions of said optical signal; and predetermining the magnitudes of said electric fields so as to control chirp in said optical signal and to promote modulation linearity by said optical modulator.

2. A method as claimed in claim 1, which includes producing said different electric fields by applying different electrical signals to modulating electrodes respectively associated with said parallel phase modulator arms.

3. A method as claimed in claim 1, which includes producing said different electric fields by employing electrodes of different effective lengths respectively associated with said parallel phase modulation arms.

4. A method as claimed in claim 1, in which the step of predetermining of the magnitudes of said electric fields is effected so as to counteract chirp in said optical signal and to promote modulation linearity in the optical modulator.

5. A method as claimed in claim 1, which includes determining the magnitude of transmission path chirp generated by said optical signal in a transmission path connected to said optical modulator and the step of predetermining the magnitudes of said electric fields is effected so as to output from said optical modulator in said optical signal a correction chirp which counteracts said transmission path chirp so as to reduce residual chirp in said optical signal after propagation of said optical signal through said transmission path.

6. A chirp-controlled optical modulator, comprising:

a substrate;

an optical signal path on said substrate;

said optical signal path comprising, in succession, an input wave guide, a splitter, a first pair of parallel phase modulation arms, a first coupler, a second pair of parallel phase modulation arms, a second coupler and a output wave guide;

phase modulation electrodes associated with said parallel phase modulation arms;

a modulation signal source connected to said modulation electrodes for applying electric fields across said parallel phase modulation arms and thereby modulating respective portions of said optical signal; and means for producing pre-determined differences between said electric fields so as to control the magnitude of chirp in said optical signal and promote modulation linearity in said modulation.

7. An optical modulator as claimed in claim 6, in which said means for providing pre-determined differences between said electric fields comprise means for applying different electrical signals to said modulating electrodes.

8. An optical modulator as claimed in claim 6, in which said means for producing pre-determined differences between said electric fields comprise electrodes of different effective lengths provided as said modulation electrodes.

* * * * *